Oct. 17, 1939.  R. G. REYNOLDSON  2,176,313
HOG SCALDING APPARATUS
Filed Nov. 2, 1936   3 Sheets-Sheet 2
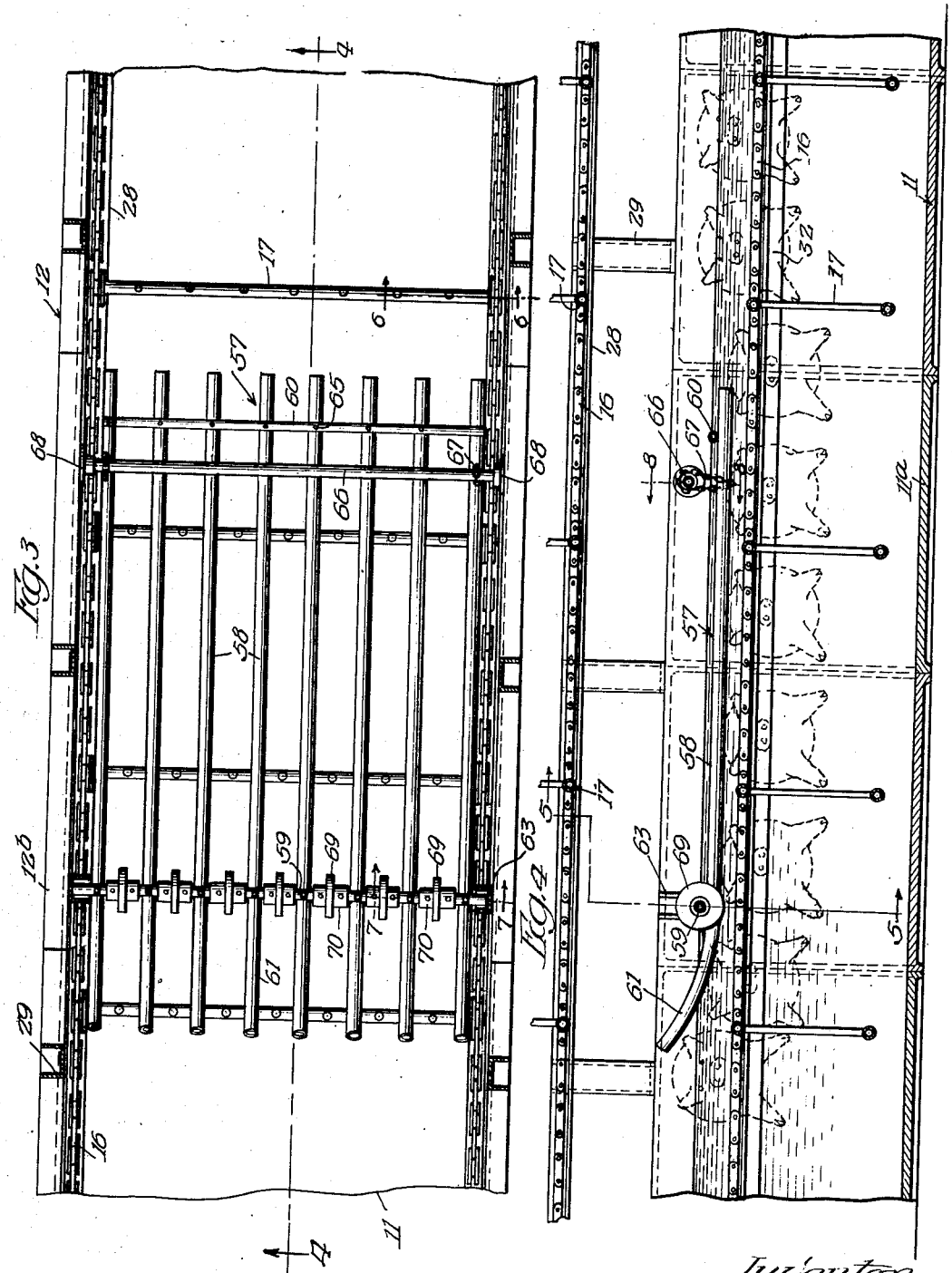

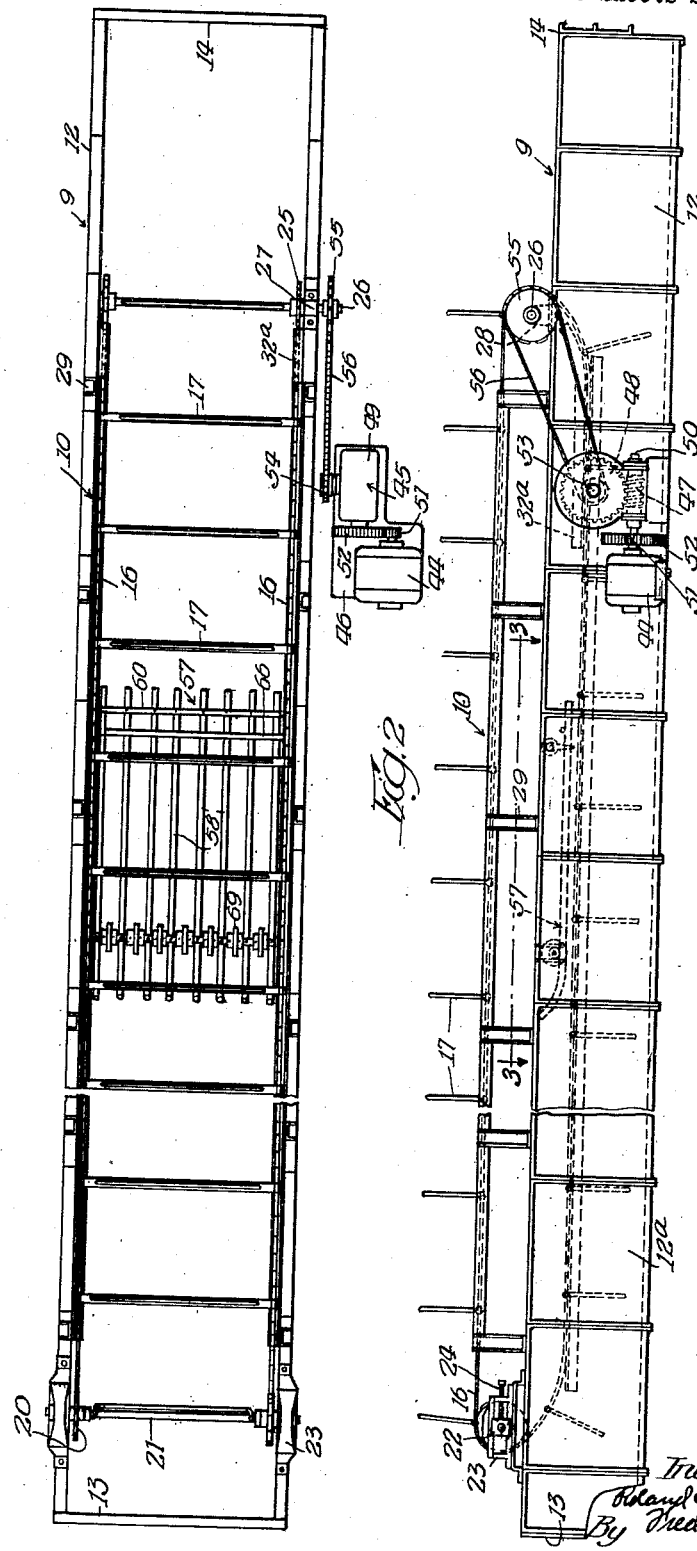
Oct. 17, 1939.    R. G. REYNOLDSON    2,176,313
HOG SCALDING APPARATUS
Filed Nov. 2, 1936    3 Sheets-Sheet 1

Oct. 17, 1939.    R. G. REYNOLDSON    2,176,313
HOG SCALDING APPARATUS
Filed Nov. 2, 1936    3 Sheets-Sheet 3
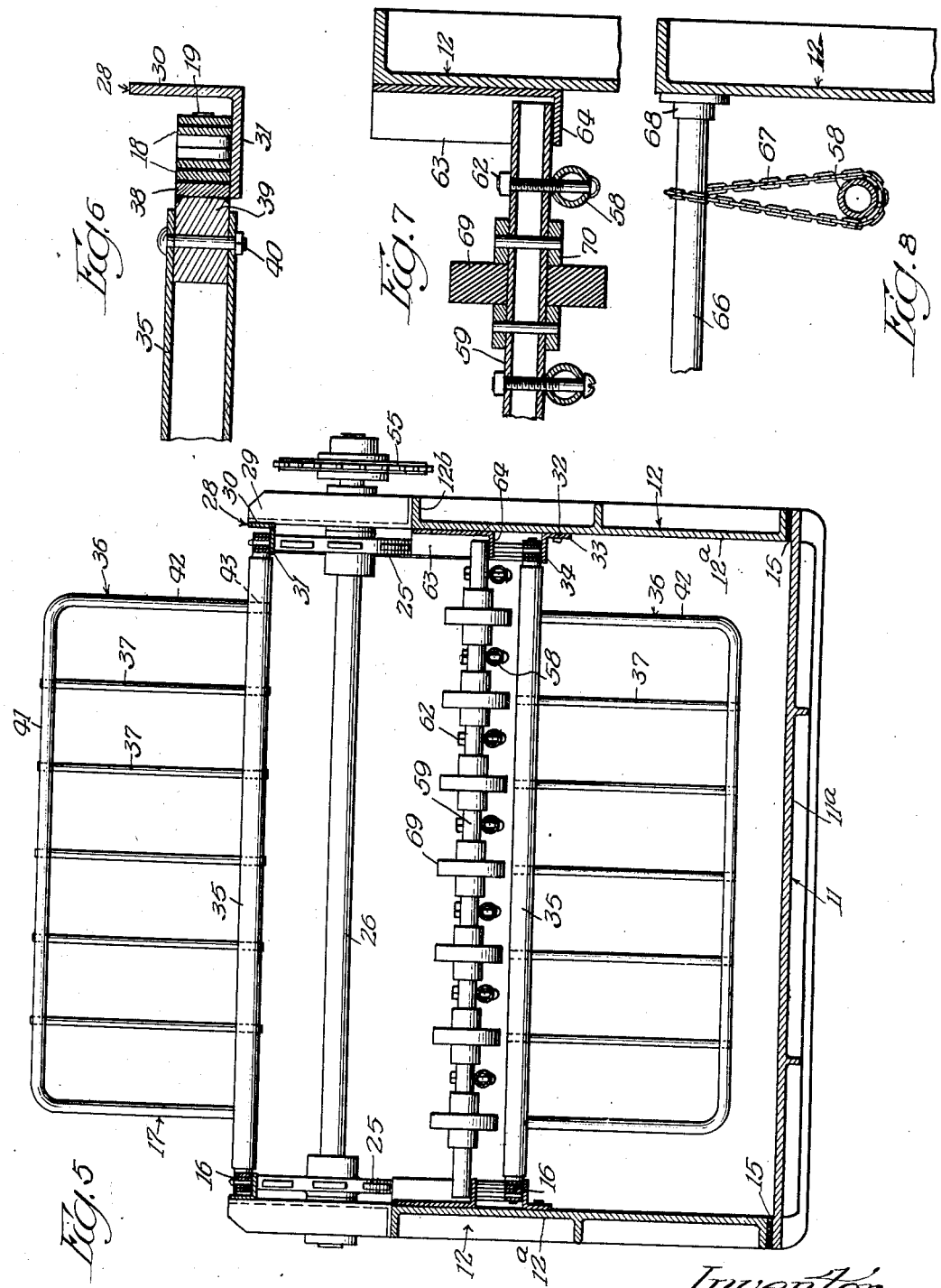

Patented Oct. 17, 1939

2,176,313

UNITED STATES PATENT OFFICE 2,176,313

HOG-SCALDING APPARATUS

Roland G. Reynoldson, Madison, Wis., assignor to The Allbright-Nell Co., Chicago, Ill., a corporation of Illinois Application November 2, 1936, Serial No. 108,767

9 Claims. (Cl. 17—15)

The present invention relates generally to apparatus for scalding hogs. More particularly the invention relates to that type of hog scalding device which is adapted for use in a meat packing plant or like establishment, serves to clean the hogs after the slaughtering operation and to condition or prepare them for treatment by a dehairing machine, and comprises (1) an elongated horizontally extending tub which is adapted to contain hot water and to have the hogs to be scalded introduced one after another into one end thereof; and (2) mechanism for propelling or pushing the hogs from the receiving end of the tub to the other or discharge end in order to effect cleaning and scalding thereof during transit.

In an apparatus of this type the hogs as they are pushed or propelled along the tub tend to float with their backs uppermost and above the water. This is directly attributable to the fact that the hogs are lighter than water and the hoofs of the hogs because of their heaviness sink toward the tub bottom and bring the backs of the carcasses uppermost. The length of the tub and the speed at which the hogs are pushed or propelled from the receiving end of the tub to the discharge end are ordinarily such that when the hogs are removed from the discharge end of the tub the side and belly portions as well as the heads and legs are in proper condition for treatment by the dehairing machine. Because of the tendency of the hogs to float with their backs above the water the backs of the hogs unless the hogs are dipped under the water are not in condition for dehairing. If the hogs are held in their entirety under the water during transit through the tub the backs of the hogs which are softer and more thin skinned than the other parts of the carcasses are scalded and softened to such an extent that they are likely to be damaged or injured when subjected to the action of the beaters of the dehairing machine.

One object of the present invention is to provide a hog scalding device which is an improvement upon, and is more efficient than, previously designed apparatus of the same general character by reason of the fact that it includes mechanical means whereby the hogs during transit through the tub are automatically dipped and held beneath the surface of the water for such a period of time that the tender and thin skinned backs of the hogs are scalded sufficiently to permit of ready dehairing but insufficiently to soften or weaken them to the point where they are likely to become injured or damaged by the beaters of the dehairing machine.

Another object of the invention is to provide a hog scalding apparatus of the last mentioned character in which the mechanism for pushing or propelling the hogs through the tub comprises a horizontally extending double chain type endless conveyor which is disposed above and extends lengthwise of the tub, embodies a series of equidistantly spaced pusher type flights between the chains, and is constructed and arranged so that the lower reach thereof travels adjacent to the surface of the water in the tub and the flights thereof project downwards and pass through the water for hog pushing or propelling purposes during drive of the conveyor.

Another object of the invention is to provide a hog scalding apparatus of the type and character under consideration in which the means whereby the hogs are caused automatically to be dipped and held underneath the surface of the water for a limited period of time during transit to the discharging end of the tub consists of a horizontally extending frame which is disposed over the lower reach of the endless conveyor.

A further object of the invention is to provide a hog scalding apparatus of the type and character last mentioned in which the horizontally extending frame which constitutes the automatic hog dipping means is located near the discharge end of the tub so that the hogs are wholly immersed within the tub directly before discharge thereof and the backs hence do not have an opportunity to cool before the hogs are delivered to the dehairing machine.

A still further object of the invention is to provide a hog scalding apparatus which is generally of new and improved construction and may be manufactured and maintained or operated at a low and reasonable cost.

Other objects of the invention and the various advantages and characteristics of the present hog scalding apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a plan view of a hog scalding apparatus embodying the invention;

Figure 2 is a side elevational view;

Figure 3 is an enlarged horizontal section taken on the line 3—3 of Figure 2, and showing the portion of the tub which contains the hog dipping frame;

Figure 4 is a vertical longitudinal section taken on the line 4—4 of Figure 3 and showing in detail the manner in which the frame operates to dip and hold the hogs beneath the surface of the water for a limited period of time as they pass or travel towards the discharge end of the tub;

Figure 5 is an enlarged vertical transverse section taken on the line 5—5 of Figure 4 and illustrating the construction and arrangement of the endless conveyor which forms a part of the means for propelling the hogs from the receiving end of the tub to the discharge end for cleaning and scalding purposes;

Figure 6 is an enlarged sectional view on the line 6—6 of Figure 3 showing the manner in which the pusher-type flights are connected to the chains of the endless conveyor;

Figure 7 is an enlarged sectional view taken on the line 7—7 of Figure 3 and showing one of the rollers at the head end of the hog dipping frame; and Figure 8 is an enlarged sectional view taken on the line 8—8 of Figure 4 and illustrating the manner in which the tail or rear end of the dipping frame is suspended within the tub.

The hog scalding apparatus which is shown in the drawings constitutes the preferred embodiment of the invention. It is adapted primarily for use in a meat packing plant or like establishment in connection with the preparation for market of slaughtered hogs and comprises a tub 9 and an endless conveyor 10 for pushing or propelling hogs one after another through the tub.

The tub 9 is elongated and extends horizontally. It is adapted to rest on the floor of the packing plant in which the apparatus is employed or to be supported in an elevated position with respect to the floor by means of standards or legs (not shown), and embodies a bottom 11, a pair of sides 12, and a pair of end walls 13 and 14. The bottom 11 is in the form of a plurality of metallic sections 11ª. These sections, as shown in the drawings, are arranged in series form and with the end margins thereof in abutting relation. The sides 12 are disposed in laterally spaced relation. They extend lengthwise of, and project upwardly from, the side margins of the bottom forming sections 11ª and consist of metallic sections 12ª. The latter embody out-turned marginal flanges 12ᵇ, the bottom portions of which rest on gaskets 15 along the side margins of the tub bottom 11 and the side portions of which are suitably secured in sealed and abutting relation. By reason of the sectional design or construction of the bottom and sides the tub the tub may be made of any desired length. The end wall 13 is located at one end of the tub. It extends across and is secured to the contiguous end portions of the bottom 11 and the sides 12 and forms with such end portions the receiving end of the tub. The end wall 14 is located at the other end of the tub and extends across and is suitably secured to the adjacent end portions of the tub bottom 11 and the sides 12. It is positioned in opposed relation with respect to the end wall 13 and defines with said contiguous end portions of the bottom and sides of the tub the discharge end of the tub. The tub is adapted to be filled with hot water. During operation of the apparatus the hogs to be scalded are introduced one at a time into the receiving end of the tub and are propelled by the endless conveyor 10, as hereinafter described, through the tub to the discharge end thereof. As the hogs pass through the hot water in the tub they are cleaned and scalded and thus prepared for treatment in a hog dehairing machine (not shown). The water may be heated in any suitable manner and is introduced into the tub 9 by a pump or like supply means (not shown). After passage through the tub the hogs are removed from the discharge end either by way of an endless conveyor or like means and then introduced into the dehairing machine for dehairing purposes.

The endless conveyor 10 operates to propel the hogs continuously and at a substantially uniform speed from the receiving end of the tub 9 to the discharge end. It is disposed above and extends lengthwise of the tub and comprises a pair of laterally spaced endless chains 16 and a plurality of hog pushing flights 17. The chains are located adjacent to and extend lengthwise of the sides of the tub. They are cross-connected by the hog pushing flights 17 and consist of pairs of links 18 and pivot pins 19. The pairs of links are arranged in end to end relation and are pivotally connected together by the pivot pins 19. The front ends of the chains, that is, the ends at the receiving end of the tub 9, extend around and are carried by a pair of sprocket wheels 20. The latter, as shown in Figure 1, are mounted on a shaft 21 which extends across the receiving end of the tub and is journaled at the ends thereof in a pair of bearing blocks 22. The latter, as shown in Figure 2 of the drawings, are mounted for horizontal sliding movement in a pair of frames 23 on the sides 12 of the tub and are adapted to be slid or adjusted with respect to the frame for chain tightening purposes by means of a pair of bolts 24. The latter extend through the frames 23 and fit within sockets in the bearing blocks 22. The other ends of the chains, that is, the ends at the discharge end of the tub, extend around and are carried by a pair of sprocket wheels 25. The latter are fixedly secured to a shaft 26 which extends across the discharge end of the tub and is mounted in a pair of bearings 27 on the sides 12 of the tub. The chains are carried by the sprocket wheels so that their upper reaches are spaced a short distance above the top margins of the tub sides and the lower reaches are located a slight distance beneath the level of the water in the tub. The upper reaches of the chains are supported by, and travel in a slidable manner on, a pair of horizontally extending angle iron rails 28. The latter are carried by brackets 29 over the sides 12 of the tub and comprise vertically extending legs 30 and horizontally extending legs 31. The brackets 29 are fixedly secured to and project upwardly from the top portions of the outturned marginal flanges 12ᵇ of the sections 12ª of the tub sides and are spaced equidistantly apart. The legs 30 of the rails are bolted or otherwise fixedly secured to the upper ends of the brackets and form side stops or abutments for preventing outward lateral displacement of the upper reaches of the conveyor chains. The horizontally extending legs 31 of the rails are formed integrally with, and extend inwardly from, the bottom margins of the legs 30 and receive and support the upper reaches of the chains. The lower reaches of the chains 16 are carried by and ride on a pair of horizontally extending angle iron rails 32. The latter are fixedly secured to, and extend lengthwise of, the central portions of the sides 12 of the tub and comprise vertically extending legs 33 and horizontally extending legs 34. The vertical legs fit against the inner faces of the sections 12ᵃ of the tub sides and the horizontally extending legs 34 are formed integrally with and extend inwardly from the upper margins of the vertical legs and underlie and support the lower chain reaches. Curved angle iron rails 32ᵃ are located adjacent to the rear ends of the rails 32, that is, the ends of the rails at the discharge end of the tub 9. These rails 32ᵃ are suitably secured to the inner faces of the tub sides 12 and serve to guide the portions of the chains between the rear ends of the rails 32 and the sprocket wheels 25. The flights 17 extend between and serve as cross-connections for the chains 16 and comprise cross-pipes 35, U-shaped bars 36, and slats 37. The pipes 35 are spaced equidistantly apart and are connected to the chains 16 by means of elongated plates 38. The latter are located inwardly of certain of the links of the chains and have circular apertures at the ends thereof through which certain of the pivot pins 19 extend. Cylindrical studs 39 are welded or otherwise fixedly secured to, and project inwardly from, the central portions of the plates 38 and fit within the ends of the cross-pipes 35. Pins or bolts 40 extend through the ends of the cross-pipes and the studs and serve to hold the pipes and plates in connected relation. The bars 36 extend outwardly from the cross-pipes and consist of central pieces 41 and side or leg pieces 42. The central pieces 41 of the U-shaped bars extend parallel to, and are spaced outwardly from, the cross-pipes 35 and the side or leg pieces 42 project radially with respect to the cross-pipes. The inner extremities of the side or leg pieces 42 of the bars 36 extend through sockets 43 in the ends of the cross-pipes and are fixedly secured in place. The slats 37 extend between and are suitably connected to the central pieces 41 of the U-shaped bars 36 and the central portions of the cross-pipes 35. The flights are so connected to the chain that they project upwards during travel thereof in the upper reach of the conveyor and project downwards into the water during travel with the lower reach of the conveyor. The conveyor is adapted, as hereinafter described, to be driven in such manner that the upper flight travels towards the receiving end of the tub and the lower reach travels toward or in the direction of the discharge end. When the hogs in the receiving end of the tub come into contact with the flights they are pushed by the latter until they reach the discharge end of the tub. Due to the specific construction and arrangement of the hog pushing flights the hogs are permitted during travel or passage through the tub to assume their normal floating position wherein the backs thereof are uppermost and above the water and the legs or hoofs extend downwards.

The conveyor 10 is driven for hog pushing or propelling purposes by means of an electric motor 44 and a speed reducing unit 45. The motor 44 is located adjacent to the discharge end of the tub and is mounted on a bed plate 46 at one side of the tub. The speed reducing unit 45 comprises a worm 47 and a worm gear 48. It is mounted on the bed plate 46 and embodies a housing 49 for the worm and worm gear. The worm 47 meshes with and serves to drive the worm gear 48 and is fixed to a horizontally extending shaft 50. The latter is journaled in and extends through the housing 49 and is driven from the armature shaft of the electric motor 44 by means of a pinion 51 and a gear 52. The pinion is mounted on, and is fixed for drive by, the armature shaft and meshes with the gear 52. The latter is located outside of the housing 49 and is fixed to one end of the shaft 50. The worm gear 48 is fixed to a cross-shaft 53 in the housing 49 and is connected to drive the shaft 26 by means of a pair of sprockets 54 and 55 and an endless chain 56. The shaft 53 extends through and is journaled in the housing 49 and at one end thereof carries the sprocket 54. The sprocket 55 is mounted on one end of the shaft 26 and is connected for drive from the sprocket 54 by the chain 56. When current is supplied to the motor 44 the shaft 26 is driven through the medium of the gearing between the motor and the speed reducing unit and the sprocket and chain drive between the unit and the shaft. In response to drive of the shaft 26 the sprocket wheels 25 are turned or driven and they, in turn, operate to drive the endless conveyer 10 so that it operates to propel the hogs in the tank from the receiving end of the tank to the discharge end. The conveyor is adapted to be driven at such a speed by the motor 44 and speed reducing unit 45 that the hogs during travel or passage from the receiving end of the tub to the discharge end remain in the water for a sufficient length of time to adapt or condition them for treatment in the dehairing machine.

In order to dip the hogs beneath the surface of the water so that the backs thereof are cleaned and scalded as well as the side and belly portions and other carcass parts during travel of the hogs through the water, a frame 57 is provided. This frame is positioned adjacent to the discharge end of the tub and is located between the upper and lower reaches of the conveyor. It extends between the upper portions of the sides 12 of the tub and consists of a plurality of laterally spaced bars 58. The latter, as shown in Figure 3, extend lengthwise of the tub and are cross-connected by a pair of crossbars 59 and 60. The frame, as shown in Figure 4, extends horizontally and for the most part is disposed beneath the top surface or level of the water in the tub. The front ends of the bars 58, that is, the ends which extend in the direction of the receiving end of the tub, are bent upwards and form curved hog deflectors 61. When the hogs during passage thereof through the tank as the result of the operation or action of the endless conveyor 10, strike against the deflector 61 they are dipped beneath the water, as shown in Figure 4. Thereafter they travel under the bars 58 and are maintained by the latter in a wholly immersed condition as far as the water is concerned until they reach the rear ends of the frame bars 58. As soon as the hogs pass the rear ends of the bars they are free so that they may again attain their normal floating position with their backs uppermost and their legs pointing downward towards the tub bottom. The crossbar 59 extends across the front ends of the bars 58 and is secured to the latter by means of bolts 62. It is located adjacent to the deflectors 61 and together with the bolts 62 serves to hold the bars 58 apart. The ends of the crossbar 59 project outwardly of the outermost bars 58 and fit slidably within channel iron brackets 63. The latter are fixedly secured to the inner faces of the tub sides 12. They extend vertically, as shown in Figure 4, and form with the ends of the crossbar 59 sliding connections whereby the frame 57 is permitted to move vertically. Lugs 64 extend across the lower ends of the brackets 63 and serve as stops or abutments for limiting downward movement of the front end of the frame. The crossbar 60 extends across the rear ends of the frame bars 58 and is fixedly secured to the latter by means of bolts 65. The rear end of the frame is suspended from a cross-shaft 66 by means of a pair of chains 67. The shaft 66 extends across the upper portion of the tub 9 and is fixedly secured to the tub sides by means of a pair of socket-type attaching members 68. The chains 67 extend around the shaft 66 and encircle the rear ends of two of the frame bars 58, as shown in Figure 8. The rear end of the frame because of the fact that it is supported or suspended from above by the chains 67 is free to swing or move upwards to a limited extent. The length of the dipping frame 57 is such that the hogs are caused to be held or fully immersed in the scalding water for a period sufficient to cause the comparatively tender and thin skinned backs of the hogs to be properly conditioned for treatment in the dehairing machine, but insufficient to cause the hog backs to become softened or weakened to a point where they are likely to become damaged or injured by the beaters of the dehairing machine. Rollers 69 are mounted on the crossbar 59 between the frame bars 58. These rollers project a slight distance beneath the bars 58 and when struck by the hogs as the latter pass thereunder, permit the hogs to right themselves after being deflected to one side by the deflectors 61. Collars 70 are fixedly mounted on the bar 59 and serve to hold the rollers 69 against axial movement with respect to the crossbar 59.

Assuming that the hogs are being introduced into the receiving end of the tub 9 one at a time and that the endless conveyor 10 is in operation, the operation of the apparatus is as follows: As soon as the pusher-type flights 17 of the conveyor encounter the hogs in the receiving end of the tub they start the hogs on their way toward the discharge end. In view of the fact that the conveyor travels continuously as contradistinguished from intermittently, travel of the hogs from the receiving end of the tub to the discharge end is at uniform speed. When the hogs encounter the deflectors 61 at the front ends of the bars 58 of the dipping frame they are deflected downwards from their normal floating position and are brought under the bars 58. The latter, as hereinbefore, pointed out, hold the hogs in a fully immersed position in the scalding water so that the backs of the hogs which are normally above the water are subjected to the scalding action of the water and are hence conditioned for treatment in the dehairing machine. As soon as the hogs pass the rear ends of the bars 58 they are free again to rise to the surface and to assume their normal floating position. Removal of the hogs from the tub after passage of the hogs from the receiving end to the discharge end is effected in any suitable manner and the hogs upon removal from the discharge end of the tub are ready for dehairing in the dehairing machine. Because the backs of the hogs are not scalded for the same length of time as the other parts of the hogs there is no likelihood of them being damaged or injured when they encounter the beaters of the dehairing machine.

The herein described hog scalding apparatus is essentially automatic and due to the fact that it consists of but a small number of parts may be constructed at a low and reasonable cost.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a hog scalding apparatus of the character described, the combination of an elongated tub adapted to contain water for scalding purposes and to have slaughtered hogs moved from one end thereof to the other through the water, and a frame positioned in one portion of the tub and for the most part, beneath the level of the water and having the head end thereof shaped to deflect or dip the hogs under the water and mounted so that it is free to move vertically to a limited extent in response to striking of the hogs thereagainst and having the remainder thereof substantially straight and horizontal and adapted to hold the hogs fully immersed in the water during passage through said one portion of the tub in order to effect a limited scalding of the backs of the hogs.

2. In a hog scalding apparatus of the character described, the combination of an elongated tub adapted to contain water for scalding purposes and to have slaughtered hogs move from one end thereof to the other through the water, and a horizontally extending frame in one portion of the tub and for the most part beneath the level of the water comprising a plurality of laterally spaced bars extending longitudinally of the tub and having the head or front ends thereof bent upwardly to form deflectors for deflecting downwards into the water the hogs striking thereagainst and having the remainder thereof substantially straight and horizontal and adapted to hold the deflected hogs fully immersed in the water during passage through said one portion of the tub in order to effect a limited scalding of the backs of the hogs, said frame being mounted so that it is free to move vertically to a limited extent in response to the action of the hogs striking against and passing under the bars.

3. In a hog scalding apparatus of the character described, the combination of an elongated tub adapted to contain water for scalding purposes and to have slaughtered hogs move from one end thereof to the other through the water, and a frame in one portion of the tub comprising a plurality of laterally spaced bars extending lengthwise of the tub and for the most part beneath the level of the water and having the head or front ends thereof bent upwardly to form deflectors for deflecting downwards into the water the hogs striking thereagainst and having the remainder thereof substantially straight and horizontal and adapted to hold the deflected hogs fully immersed in the water during passage through said one portion of the tub in order to effect a limited scalding of the backs of the hogs, and also comprising a cross-bar extending across and rigidly secured to said front or head ends of the bars and having the ends thereof mounted for vertical sliding movement in slideways at the sides of the tub in order to permit the head end of the frame to move upwards in response to striking of the hogs against the head ends of the bars.

4. In a hog scalding apparatus of the character described, the combination of an elongated tub adapted to contain water for scalding purposes and to have slaughtered hogs moved from one end thereof to the other through the water, a horizontally extending frame extending across one portion of the tub and beneath the level of the water and comprising a plurality of laterally spaced bars extending longitudinally of the tub and having the head or front ends thereof bent upwardly to form deflectors for deflecting downwards into the water the hogs striking thereagainst and having the remainder thereof adapted to hold the deflected hogs fully immersed in the water during passage through said one portion of the tub in order to effect a limited scalding of the backs of the hogs, and rollers carried by the frame between the head or front ends of the bars for engaging the hogs after downward deflection by said head ends and permitting the hogs readily to right themselves prior to passage under said remainder of the bars.

5. In a hog scalding apparatus of the character described, the combination of an elongated tub adapted to contain water for scalding purposes and to have slaughtered hogs introduced one at a time into one end thereof, a power driven elongated endless conveyor associated with and extending lengthwise of the tub and having an upper reach above the tub, a lower reach beneath the surface of the water and rotary supporting elements at the ends of the two reaches above said surface of the water, and also having substantially flat flights adapted during drive of the conveyor and travel in the lower reach to push the hogs from said one end of the tub to the other end and at the same time permit the hogs to float with their backs uppermost and above the water, and a frame between upper and lower reaches of the conveyor carried by and extending across the central portion of the tub and arranged to hold the hogs therebeneath and fully immersed in the water during passage of the hogs to said other end of the tub in order to effect a limited scalding of the backs of the hogs.

6. In a hog scalding apparatus of the character described, the combination of an elongated tub adapted to contain water for scalding purposes and to have slaughtered hogs introduced one at a time into one end thereof, an elongated endless conveyor extending longitudinally of the tub and having an upper reach above the tub, a lower reach beneath the surface of the water, and rotary supporting elements at the ends of the reach and above said surface of the water, power means for driving the conveyor, and a frame between the upper and lower reaches of the conveyor and of materially less length than said conveyor reaches, designed to dip the hogs under the water and then hold them fully immersed therein during passage of the hogs through a portion of the tub so as to effect a limited scalding of the backs of the hogs, said frame being carried by the tub so that it is free to move vertically to a limited extent in response to the action of the hogs striking thereagainst and passing thereunder.

7. In a hog scalding apparatus of the character described, the combination of an elongated tub adapted to contain water for scalding purposes and to have slaughtered hogs introduced one at a time into one end thereof, an elongated endless conveyor extending longitudinally of the tub and having an upper reach above the tub, a lower reach beneath the level of the water in the tub and also having substantially flat flights adapted during drive of the conveyor and travel in the lower reach to push the hogs from said one end of the tub to the other and at the same time to permit the hogs to float with their backs uppermost and above the water, power means for driving the conveyor and a frame of materially less length than the conveyor located beneath the upper and lower reaches of said conveyor and adjacent to the surface of the water in the tub and comprising a plurality of laterally spaced bars extending lengthwise of the tub having the head or front ends thereof shaped to deflect the hogs under the water and the remainder substantially straight and horizontal and adapted to hold the deflected hogs fully immersed in the water during passage thereunder in order to effect a limited scalding of the backs of the hogs.

8. In a hog scalding apparatus of the character described, the combination of an elongated tub adapted to contain water for scalding purposes and to have slaughtered hogs moved from one end thereof to the other through the water, a frame in one portion of the tub comprising a plurality of laterally spaced bars extending lengthwise of the tub and for the most part beneath the level of the water and having the head or front ends thereof bend upwardly to form deflectors for deflecting downwards into the water the hogs striking thereagainst and having the remainder thereof adapted to hold the deflected hogs fully immersed in the water during passage through said one portion of the tub in order to effect a limited scalding of the backs of the hogs, and also comprising a crossbar extending across and secured to said head or front ends of the bars, means applied to the ends of the crossbar for supporting the head end of the frame so that it is free to move vertically to a limited extent in response to the action of the hogs striking against said front or head ends of the bars, and means for yieldingly supporting the other end of the frame.

9. A hog scalding apparatus of the character described, comprising in combination an elongated tub adapted to contain water for scalding purposes and to have slaughtered hogs moved from one end thereof to the other through the water and having a shaft extending across one portion thereof and positioned above the water, a frame in said one portion of the tub and for the most part beneath the level of the water, having the head end thereof shaped to deflect or dip the hogs under the water and mounted so that it is free to move vertically to a limited extent in response to the action of the hogs striking thereagainst and having the remainder thereof substantially straight and horizontal and adapted to hold the hogs fully immersed in the water during passage through said one portion of the tub in order to effect a limited scalding of the backs of the hogs, and a flexible element suspended from the shaft and serving yieldingly to support the other end of the frame in order that it is free to move vertically.

ROLAND G. REYNOLDSON.